June 12, 1956  H. R. EMRICK  2,749,758
TRANSLATING MECHANISM FOR CONVERTING ROTARY
MOTION TO RECIPROCATING MOTION
Filed Oct. 30, 1953  4 Sheets-Sheet 1

INVENTOR.
HOMER R. EMRICK
BY
ATTORNEY

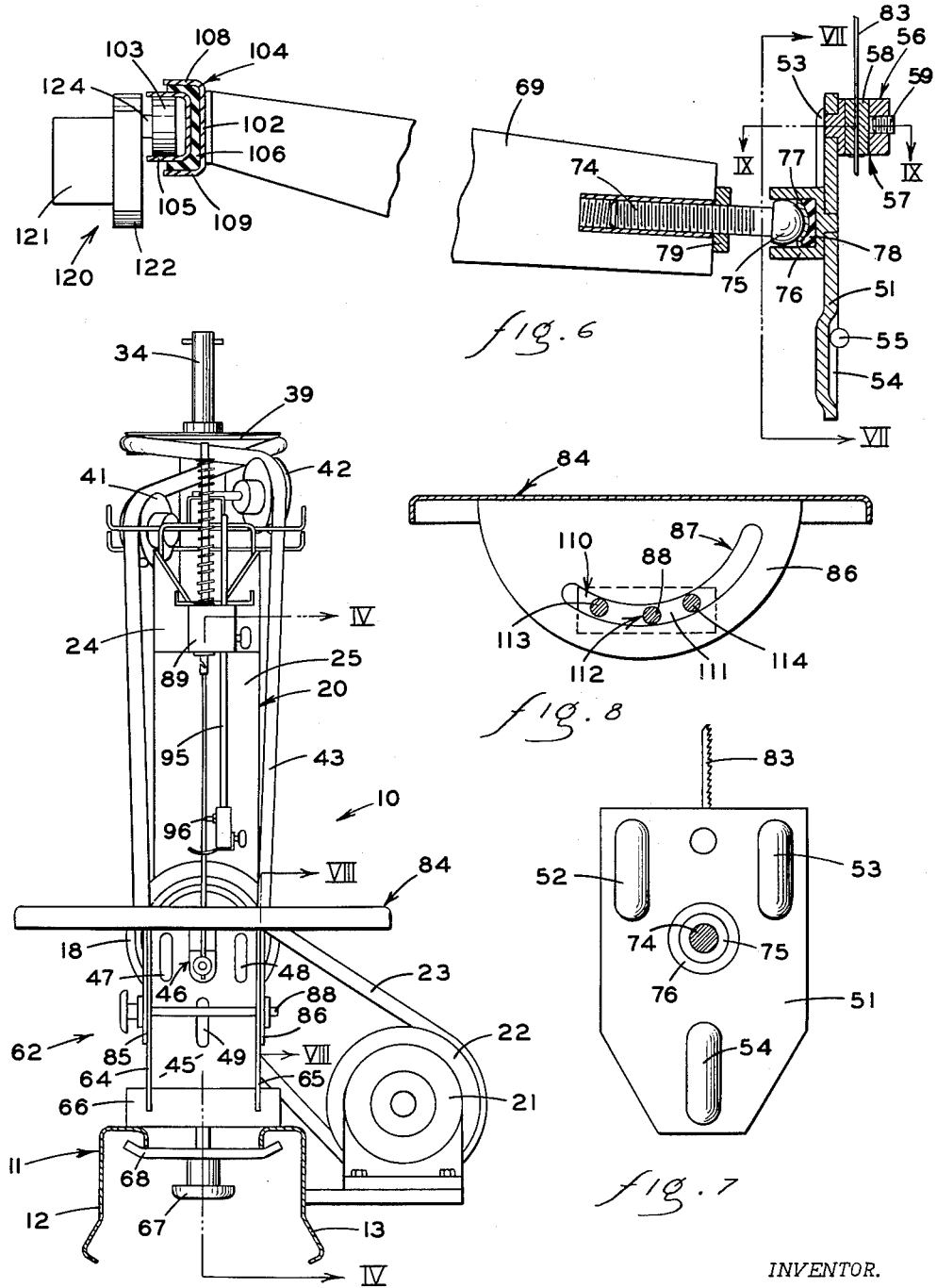

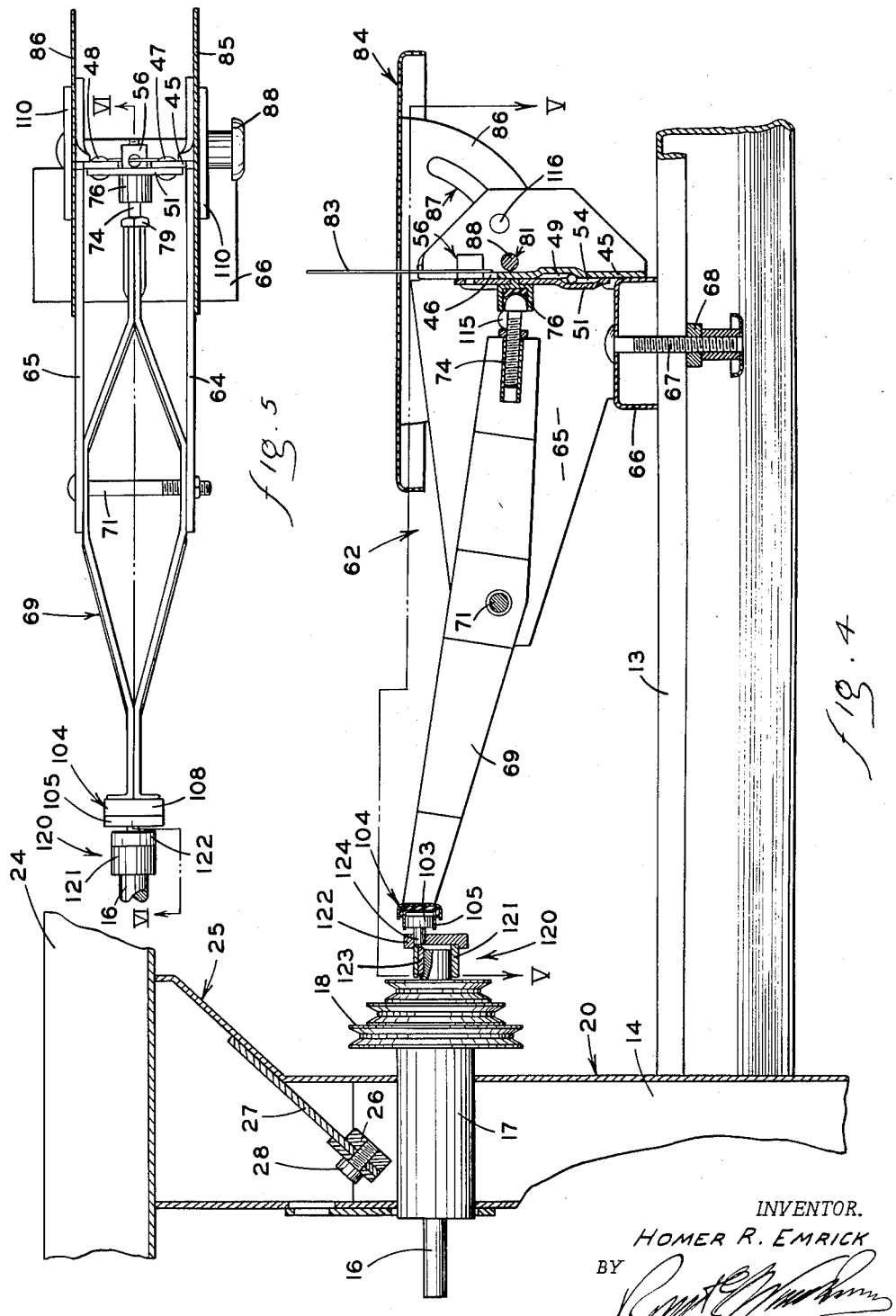

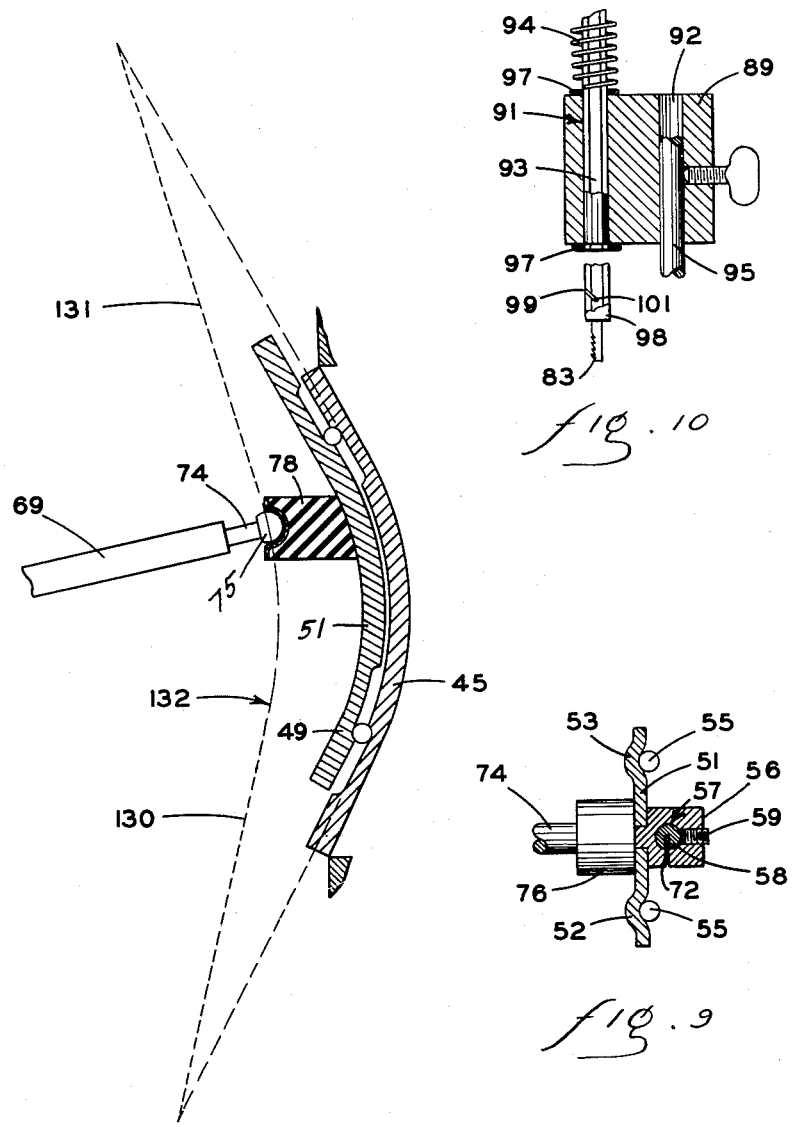

United States Patent Office 2,749,758
Patented June 12, 1956

2,749,758

TRANSLATING MECHANISM FOR CONVERTING ROTARY MOTION TO RECIPROCATING MOTION

Homer R. Emrick, Kalamazoo, Mich., assignor to Emrick Inc., Kalamazoo, Mich., a corporation of Michigan Application October 30, 1953, Serial No. 389,247

9 Claims. (Cl. 74—45)

This invention relates in general to means for converting rotary motion to reciprocating motion and particularly to means for driving a vertically reciprocable device, as a jig saw, from a rotary source horizontally spaced from said device in a direction axially of the rotary source.

Insofar as I am aware, it has been considered economically and mechanically impractical, if not impossible, to combine a jig saw with other types of power tools, such as a lathe or drill press, so that both said jig saw and said other type of power tool can be driven by a single prime mover. Obviously, the jig saw must be removable with respect to the other power tool, such as a lathe, upon whose frame it is mounted. Furthermore, the jig saw must be actuated by means, such as the live spindle of the lathe, which is already a necessary part of the other power tool to provide an uncomplicated, easily convertible structure. One of the major problems in this connection has been that of providing economical, accurate, and easily attachable and detachable means for converting the rotary motion of the lathe live spindle into reciprocating motion for the jig saw.

Accordingly, a primary object of my invention is the provision of means for driving a vertically reciprocable device, as a jig saw, from a rotary source horizontally spaced from said device in a direction perpendicularly of the direction of reciprocation of the said reciprocable device.

A further object of my invention is the provision of a jig saw, as aforesaid, which is economical in both original cost and in maintenance.

A further object of my invention is the provision of a jig saw, as aforesaid, which is accurate in operation.

A further object of my invention is the provision of a jig saw, as aforesaid, which is easily attachable and detachable and wherein the attaching and detaching may be accomplished without the use of other than simple tools.

A further object of the invention is the provision of jig saw operating means, as aforesaid, having means for converting the rotational movement of a lathe spindle into straight line, vertical reciprocation of a jig saw blade.

A further object of the invention is the provision of means for driving and supporting the driven end of a jig saw, as aforesaid, which is sturdy and efficient, which can be arranged for use readily by an amateur operator of machine tools and without the necessity of complex equipment.

A further object of the invention is the provision of means for effecting reciprocation of a device, as a jig saw blade, from an arcuately reciprocating device with a minimum of vibration, shock and wear on the parts.

A further object of the invention is to provide means for driving a reciprocable device including energy storage means such that the energy within the device can be absorbed when the device is stopped at each end of its stroke and said energy then utilized to start its next stroke.

Other objects and purposes of the invention will be apparent to persons acquainted with apparatus of this general type upon a reading of the following description and inspection of the accompanying drawings.

In the drawings:

Figure 3 is a sectional view substantially as taken along the line III—III of Figure 1.

Figure 4 is a sectional view substantially as taken along the line IV—IV of Figure 3.

Figure 5 is a sectional view substantially as taken along the line V—V of Figure 4.

Figure 6 is a broken sectional view substantially as taken along the line VI—VI of Figure 5.

Figure 7 is a sectional view substantially as taken along the line VII—VII of Figure 6.

Figure 8 is a sectional view substantially as taken along the line VIII—VIII of Figure 3.

Figure 9 is a sectional view taken along the line IX—IX of Figure 6.

Figure 10 is a broken sectional view taken along the line X—X of Figure 1.

Figure 11 is a partially schematic, exaggerated diagram illustrating certain principles of the invention.

*General description*

In meeting the objects and purposes above set forth, as well as others related thereto, I have provided for positioning between the lower end of a lineally reciprocable device, as a jig saw, and the end of a rotatable shaft spaced therefrom perpendicularly to the line of reciprocation, a lever supported for pivotal motion in a plane parallel to the said line of reciprocation. Said lever has means at one end for imparting the rotative motion of said shaft to one part, as the input part, of said lever to effect pivotal movement thereof and other means for imparting movement of another, or output, part of said lever to said jig saw blade as reciprocable movement of said jig saw blade. Particularly, said last-named means includes also means for converting the arcuate movement of said output part of said lever into straight-line movement acceptable for driving said jig saw. Power is applied from the rotating shaft to the power input part of said lever by a crank rotated by said shaft whose pin operates in a U-shaped member fastened to said lever and the power output part of said lever is connected by a lost motion mechanism to one of a pair of planes, of which one is vertically reciprocable along a straight line with respect to the other of said plates. A resilient element interposed between the power output point of the lever and the reciprocable device absorbs vibration and shocks and effects a smooth operation. Further, the resilient element provides a resilient force increasingly urging the lever toward its center position as said lever moves from its center position toward either of its extreme positions under the urging of driving means.

In the hereinafter appearing description, it will be observed that the device has been set forth with particular reference to a particular type of machine tool and, as a matter of fact, the device was designed with express attention to such a tool. However, it will be recognized that principles embodied in the invention will be applicable to a wide variety of further uses, and the detailed reference to the particular embodiment with which the invention is here illustrated is for illustrative purposes only.

Detailed description

Figure 1:
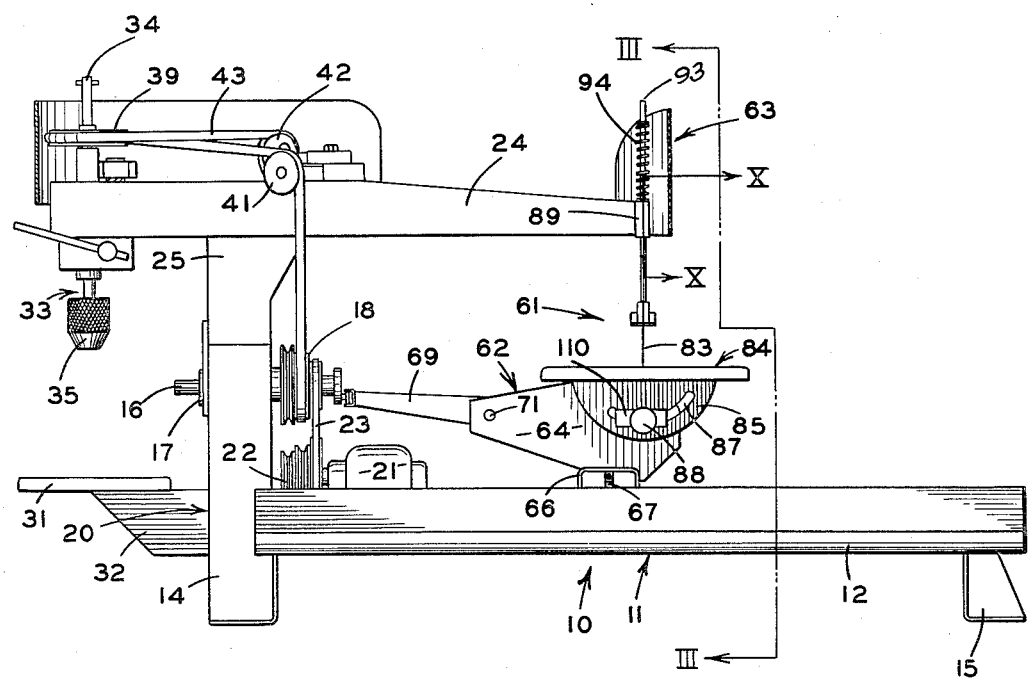
Figure 1 is a side elevational view of my multiple purpose machine.

For convenience in reference and description, the terms "upper," "lower," and derivatives thereof, as used herein, will have reference to my invention and the parts thereof as shown in Figures 1, 3 and 4. The terms "leftward," "rightward," and derivatives thereof, will have reference to the machine as shown in Figures 1, 2, 3 and 4. The terms "front," "rear," and derivatives thereof will refer to the leftward and rightward sides of my machine, respectively, as appearing in Figure 3.

Figure 2:
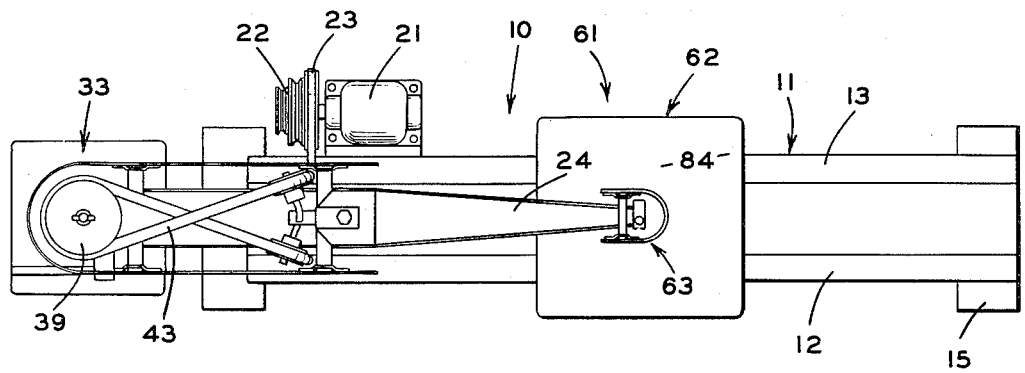
Figure 2 is a top plan view of my machine.

As shown in Figures 1, 2 and 3, particularly, a machine embodying my invention is comprised of a lathe bed 11 having a pair of horizontal, parallel ways 12 and 13, and the support section 14 of a vertical column secured intermediate its upper and lower ends to one end of said lathe bed 11. The ways 12 and 13 are connected at their opposite ends by the foot member 15, which in conjunction with the lower end of the section 14 constitutes the means supporting the machine 10. As shown in Figures 1 and 4, a lathe live spindle 16 is rotatably supported in a bearing structure 17 of any convenient, conventional type, said bearing structure 17 being supported upon and within the support section 14. Said spindle 16 is parallel with and directly above the longitudinal center line of said bed 11. A multiple groove spindle sheave, having a variety of pitch diameters, is secured in any conventional manner upon the rightward end of the spindle 16, with a portion of said spindle extending rightwardly beyond said sheave.

A prime mover, such as the motor 21, is mounted upon a bracket of any conventional type secured to the way 13 and positioned so that a multiple groove motor sheave 22 mounted upon the motor shaft is adjacent to and radially aligned with the spindle sheave 18. The sheaves 18 and 22 are interconnected by a belt 23, which may be of any convenient, conventional type.

A boom or over arm 24 is secured intermediate its ends to one end of a support post 25 (Figures 1 and 4), which post comprises, in effect, the upper section of the vertical column 20, said post 25 being removably secured upon said support section 14 thereof by means of the anchor bar 26 (Figure 4), the anchor plate 27 and anchor bolt 28.

Thus, the bottom 24, and support post 25 secured thereto, may be removed from the machine 10 by removing the single bolt 28.

A drill press table 31 (Figure 1) is mounted upon a table bracket 32 which in turn is secured to the support section 14 on the leftward side thereof. Above the drill press table 31 and upon the leftward end of the boom 24 is mounted the drill press 33 having a vertical shaft 34 with a conventional chuck 35 mounted upon the lower end thereof.

A drill press sheave 39 is mounted upon the shaft 34 above the boom 24 for driving the shaft 34. A pair of pulleys 41 and 42 are adjustably mounted upon the boom 24 above the spindle sheave 18, for turning the drill press belt 43 which interconnects the sheaves 18 and 39.

Further details with respect to the drill press 33 and parts relating thereto may be found in my application entitled "Multiple Purpose Machine Tool" filed concurrently herewith.

As shown in Figures 1, 2, 3, 4 and 5, the jig saw 61 is comprised of a base member 62 and a head member 63. The base member 62 has a pair of spaced, parallel, vertical side plates 64 and 65 secured, as by welding, along their lower edges to a downwardly opening channel 66. Said channel 66 is somewhat longer than the distance between said ways 12 and 13 and is removably secured thereto by means of the mounting bolt 67 and cross bar 68, in a conventional manner. A lever arm 69 (Figures 1, 4 and 5) is pivotally supported about midway between its ends upon a pivot shaft 71, which shaft is mounted upon and between the leftward ends of the side plates 64 and 65. Said lever 69 is here constructed from a pair of similar, co-extensive bars which are connected near their respective ends, as by welding, and spaced apart where pivoted. The leftward ends are bent away from each other and secured, as by welding, to the web 102 (Figure 6) of the U-shaped bracket 104 for reasons appearing hereinafter.

A rectangular guide plate 45 (Figures 3 and 4) extends between the rightward ends of the side plates 64 and 65 and is secured thereto, at its top, bottom and side edges only, in a vertical position, perpendicular to said side plates, as by welding. Said guide plate has a vertical slot 46 in the upper end thereof opening through the upper edge thereof midway between said side plates. A pair of vertically elongated, parallel grooves 47 and 48 are provided in the leftward face of said guide plate 45 near the upper end thereof and on opposite sides of said slot 46. A third vertically elongated groove 49 is disposed in said face below said slot 46 and midway between said grooves 47 and 48. Center points in said bearing grooves, or races, 47, 48 and 49, midway between their respective edges and ends, preferably define the corners of an isosceles triangle with the base thereof located between the center points in said grooves 47 and 48.

A substantially rectangular reciprocation plate 51 (Figures 6 and 7), slightly smaller in length and width than said guide plate 45, is removably disposed parallel with and adjacent to the leftward side of said guide plate. Said reciprocation plate 51 has three vertically elongated grooves 52, 53 and 54 in the rightward face thereof which correspond in location, position and size to the grooves 47, 48 and 49 in the opposing face of the guide plate 45. Thus, the center points of the grooves 52, 53 and 54 define the corners of an isosceles triangle identical to said triangle defined by the center points of the grooves 47, 48 and 49.

A ball bearing 55 (Figures 4 and 9) is disposed between each pair of opposing grooves in the guide and reciprocation plates, such as the grooves 49 and 54. Said bearings 55 space the adjacent faces of the plates 45 and 51 slightly from each other and, while facilitating the movement of plate 51, confine such movement to a limited, vertical reciprocation with respect to plate 45.

A cylindrical anchor post 56 (Figures 6 and 9) is secured at one axial end thereof to the rightward face of said reciprocation plate near the upper edge thereof. Said post 56 is located midway between the grooves 52 and 53 for extension through the slot 46 in plate 45. Said anchor post has a vertically positioned, transverse opening 57 in which a cylindrical, blade-engaging plug 58 is removably held by the set screw 59. A transverse blade slot 72 is provided in said anchor post 56 and radially penetrates said plug 58 slightly beyond its axis along its entire length. Thus, slot 72 penetrates in excess of half way through the post 56 and defines a plane preferably perpendicular to the axis thereof. Said slot 72 is slightly wider than the thickness of a saw blade 83 whose lower end is slidably received into said slot 72 and thereby anchored in said post 56.

An adapter bolt 74 (Figures 4, 5 and 6), having a substantially spherical head 75 of greater diameter than its shaft, is threadedly and adjustably mounted upon the rightward end of the lever arm 69. Said bolt 74 extends from said lever substantially along the lengthwise axis thereof.

A cylindrical adapter socket 76 (Figures 4, 6 and 7) is secured at one axial end thereof to the leftward face of said reciprocation plate. The axis of said socket 76 is preferably located equi-distant from the center points of the grooves 52 and 53, and at a distance below a line connecting these center points equal to about one third of the distance between said line and the center point of said groove 54. Thus, pressure imposed upon the socket 76 toward the guide plate 45 will be substantially equally distributed upon the three ball bearings 55 disposed between the plates 45 and 51.

A circular, metallic shim 77, having a central, spherical depression, is disposed in the socket 76 for seating the spherical head 75 of the adapter bolt 74. Resilient means, such as a circular rubber cushion 78, is disposed between the shim 77 and the end of the socket 76 secured to the plate 51.

With the base member 62 properly assembled, the axis of the pivot shaft 71 and the center of the spherical head 75 define a horizontal plane when the reciprocation plate is midway between its upper and lower positions of reciprocation. In such position, the guide and reciprocation plate grooves are in exact registry, the pressure between the two plates is at its maximum, and, due to the arcuate path of the rightward end of the lever arm 69, the cushion 78 is under its greatest compression. The bolt 74 is adjusted on the lever arm 69 by means of the adapter nut 79 so that there will be adequate pressure between the plates 45 and 51 to hold them together when the plate 51 is in its upper and lower positions. Thus, a straight-line, vertical movement of the plate 51, hence the blade 83 which it supports, is assured even though the movement of the lever ends is arcuate.

The bolt 74 is so adjusted that the pressure exerted by it through the rubber cushion 78 onto the stationary plate 45 will be sufficient to distort said stationary plate into a concave bearing surface. This will be facilitated by the supporting of said stationary plate only at its side, top and bottom edges as above described. The magnitude of such distorting is sufficient that the angle of the bearing surface at the limits of reciprocation will be slightly greater, with respect to the vertical, than the tangent to the arc defined by adjacent end of the lever at its limits of reciprocation. Thus, the rubber cushion 78 actually becomes progressively compressed as it travels in a given stroke from its dead center position toward either end of its reciprocating path. This force is then available at the beginning of the next stroke to aid return movement of the lever, and associated reciprocating parts, towards center position. It will, of course, be possible, in place of, or in addition to, securing the concave bearing face, to contour bottoms of the bearing grooves 47, 48 and 49 to provide some or all of such concavity without distortion of the plate 45, and such construction is within the scope of this invention.

A tiltable saw table 84 has a pair of parallel, spaced, semicircular rocker elements 85 and 86 secured to its lower surface. Said rockers, which embrace, respectively, the remote, outside surfaces of the side plates 64 and 65, are provided with arcuate slots 87. Aligned openings 81 are provided in the side plates 64 and 65, adjacent to the rightward side of the guide plate 45 to receive a table adjustment bolt 88.

A pair of saw table mounts 110 (Figures 1, 5 and 8) are each comprised of a bar 111 having a central opening 112 and a pair of parallel pins 113 and 114 extending from one face of said bar on opposite sides of said opening 112. The axes of said opening 112 and the pins 113 and 114 define an arc which is identical to the arcuate center line of the arcuate slots 87 in the rockers 85 and 86. Pin openings 115 and 116 are provided in the side plates 64 and 65 for reception of said pins 113 and 114 when the opening 112 in the bar 111 is axially aligned with the openings 81 in said side plates.

When assembled, the pins 113 and 114 of each bar 111 extend through the arcuate slot 87 of their respective rocker elements 85 and 86, and into the pin openings 115 and 116 of their respective side plates 64 and 65. The table bolt 88 is then inserted through the openings 112 in the bars 111 and the openings 81 in the side plates 64 and 65 and tightened in place. The center of the above mentioned arcs is located on the surface of the saw table 84. The table mounts 110 combine with the bolt 88 to limit tilting of said table 84 about an axis parallel with the bolt 88 and intersecting the center of said arcs on said table surface.

The head member 63 of the jig saw 61 (Figures 1, 2, 3 and 7) includes a guide block 89 (Figure 10) secured to the rightward end of the boom 24, as by welding. Said guide block 89 is provided with a pair of vertical, cylindrical openings 91 and 92 whose axes define a plane substantially perpendicular to the lengthwise extent of the boom 24. A reciprocation rod 93 is slidably, but non-rotatably, supported within the front vertical opening 91 (Figure 10) and extends above and below the guide block 89. In this particular embodiment, said reciprocation rod 93 is hexagonal in cross-section and is prevented from rotating by a pair of identical grommets 97, having hexagonal bores and secured to said block 89 at the opposite ends of the front opening 91. The lower end of the rod 93 has a central, vertical slot 98, slightly wider than the thickness of said blade 83, and a diagonal slot 99. The slot 99 penetrates diagonally, downwardly, and slightly beyond the axis of the rod 93 to receive and seat the pin 101 at the upper end of the blade 83.

The upper end of the rod 93 is encircled by a spiral spring 94 which resiliently resists downward movement of the rod 93 with respect to the block 89. A guide rod 95 is vertically, adjustably held within the rear vertical opening 92. Said guide rod 95 is provided at its lower end with means adjustably supporting the alignment bolt 96 whose end is slotted for engaging and partially embracing the saw blade 83. Thus, the guide rod 95, reciprocation rod 93 and parts associated therewith, mounted upon the guide block 89, cooperate to guide and place under continuous tension the saw blade 83 when mounted upon and extending between the head member 63 and the base member 62 of the jig saw 61.

A conversion fixture 120 (Figures 4, 5 and 6) has a sleeve 121 and flange 122 secured to one axial end of said sleeve. The sleeve 121 is slidably, but non-rotatably, mountable upon the rightward end of the spindle 16, which extends beyond the spindle sheave 18, by means such as the key and keyway 123.

A shaft 124, eccentric to and parallel with the axis of the sleeve 121, is secured to the flange 122 and extends therefrom on the opposite side thereof from said sleeve 121. A bearing 103 is rotatably supported upon the shaft 124.

The leftward end of the lever arm 69 (Figures 4, 5 and 6) supports said U-shaped horizontally positioned bracket 104. The flanges 108 and 109 of the bracket 104 are parallel and extend away from the lever 69 in substantially horizontal planes. A horizontally extending channel member 105, slightly narrower than said bracket 104, is mounted within said bracket 104 with a resilient cushion 106, as of rubber, therebetween. The flanges of said channel 105 are parallel with the flanges of the bracket 104 for closely embracing the perimeter of the bearing 103 on the fixture 120.

The channel 105 is slightly longer than the throw of the bearing 103 with respect to the axis of the sleeve 121 of the fixture 120. Thus, the bearing remains between the flanges of the channel 105 during an entire rotation of the spindle 16. The said throw of the bearing 103 is such that, when transmitted through the lever 69, it produces the desired length of stroke by the vertical reciprocation of plate 51 with respect to the guide plate 45.

*Operation*

As best shown in Figures 1, 2 and 3, the jig saw 61 is easily assembled by first mounting the boom 24 upon the support section 14 of the column 20. This is done by attaching the support post 25 to the upper end of said support section 14 by means of the bolt 28. The jig saw head member 63, being mounted upon the rightward end of the boom 24, is thus ready for use. The conversion fixture 120 is then mounted, by means of its sleeve 121, upon the rightward end of the live spindle 16. The jig saw base member 62 is placed upon the lathe bed 11 with the lever arm 69 extending toward the conversion fixture 120. Said base member 62 is moved toward the conversion fixture 120 until the channel member 105, mounted on the leftward end of the lever arm 69, embraces the periphery of the bearing 103. The base member 62 is then locked down upon the lathe bed by means of the mounting bolt 67 and cross bar 68, as shown in Figure 3. With the base member so positioned, the plug 58 in the anchor post 56 is vertically below and axially aligned with the reciprocation rod 93 in the head member 63, and the blade slot 72 in said post 56 is substantially co-planar with the vertical blade slot 98 in said rod 93. Thus, the saw blade 83 may be quickly and easily attached at its upper end to the lower end of the reciprocation rod 93, and attached at its lower end to the anchor post 56, which is accessible from the rightward side of the base member 62, as shown in Figure 3. Such attachment will necessitate a compression of the spring 94 which is accomplished by depressing the upper end of the rod 93. Thus, the blade 83 is immediately placed under tension, which tension is increased as the rod 93 is depressed additionally by the lever 69 acting through the plate 51 and said blade 83.

Rotation of the spindle 16 by the motor 21 causes the bearing 103 to move in a circular path about the axis of the spindle 16. Such motion is translated by the bearing 103 and the channel 105 into a substantially vertical reciprocation of the leftward end of the lever arm 69. Such motion is, in turn, transmitted to the rightward end of the lever arm 69 and converted from an arcuate, vertical reciprocation thereof into a strictly vertical reciprocation of the plate 51 to which the anchor post 56 is secured. Thus, the whip or sideward displacement of the blade 83, which would be imparted thereto if directly connected to said lever 69, due to its arcuate movement is entirely avoided. It is this feature which makes possible the adaptation of the jig saw 61 to the power source provided by the lathe spindle 16.

As shown in Figures 1, 3 and 7, the reciprocation rod 93 is urged upwardly by the spring 94, encircling the upper end thereof. The spring is so designed that it is under a predetermined tension when the blade 83 is mounted between the lower end of the reciprocation rod 93 and the anchor post 56 on the base member 62 when the rightward end of the lever arm 69 is in its uppermost position. Thus, the lever 69 draws the blade 83 downwardly and the spring 94, acting through the rod 93, draws the blade 83 upwardly as the lever moves upwardly. The blade 83 is mounted upon the anchor post 56 so that said post can not positively drive the blade 83 upwardly. This arrangement is provided to prevent the post 56 from buckling the saw blade 83 as it moves upwardly, if said blade is seized by the work piece.

In view of the distortion of the plate 45, shown in an exaggerated manner in Figure 11, by which the mutually remote extremities of the bearing races 47, 48 and 49 are convergingly related to the tangents 130 and 131 at the ends of the arc 132 of oscillatory motion of the bolt head 75, it will be apparent that the compression on the rubber cushion 78 is at a minimum in the dead center position and is at a maximum at each end of the stroke. Thus, there is provided means for storing energy at each end of each stroke of the reciprocating means and said stored energy in said rubber cushion assists the commencement of the next stroke. Thus, the operation of the device will be extremely smooth and shocks and vibrations will be reduced to a minimum. Particularly, any slack or clearance in any part of the reciprocating mechanism, or the driving mechanism of same, will be prevented from causing shocks and vibrations and the entire apparatus will run smoothly.

Further, the arcuate path of the races 47, 48 and 49 will permit a slight horizontal movement of the vertically movable plate 51 and will thereby permit a slight horizontal movement of the lower end of the saw blade. This tends to keep the cut being made by the saw sufficiently wide to prevent binding of the saw and further assist a rapid and efficient operation.

The alignment bolt 96 mounted on the lower end of guide rod 95 maintains and controls the proper vertical alignment of the saw blade 83 against pressures imposed thereon by a work piece being applied to the saw blade 83. The saw table 84 may be adjusted in a variety of positions by loosening and then tightening the table adjustment bolt 88 in a conventional manner. The table 84 has a central opening through which the blade 83 extends.

It will be readily seen that the base member 62 could be mounted upon the drill press table 31 by simple modifications of their mounting structures. Likewise, the head member 63 could be detachably mountable upon the means, such as the leftward end of the boom 24, supporting the drill press 33. In such case, the fixture 120 would be mounted on the leftward end of the spindle 16. Thus, my jig saw is easily adaptable to and operable by the drive means of a variety of power tools, and it will be apparent that the herein described motion converting device will be adaptable to many other uses where it is desired to convert rotary motion at one point to a straight-line reciprocating motion at another point spaced from said one point.

Therefore, although the above description and accompanying drawings relate to a preferred embodiment of my invention, it will be understood that modifications thereof lying within the scope of such disclose are fully contemplated unless specifically stated to the contrary in the appended claims.

I claim:

1. Translating mechanism for converting rotary motion of a lathe live spindle to reciprocating motion for a jig saw, said reciprocating motion being caused to occur at a point spaced from the source of rotary motion in a direction axially of said source, comprising in combination: a base; a lever pivotally mounted on said base for pivotal motion in a vertical plane and having a power receiving point and a power delivering point; a channel carried at the power receiving point, facing said source and arranged with its length perpendicular to the axis of said source and perpendicular to the direction of said reciprocating motion; a crank having its hub connected to said source and its pin within said channel; a pair of relatively slidable plates including means guiding same with respect to each other in the direction of said reciprocating motion, one of said plates being anchored to said base; means including an energy storing means connecting the power delivering point with the other of said plates.

2. In a translating mechanism having a base member and a lever pivotally supported intermediate its ends upon said base member for movement about a horizontal axis and an adapter for converting arcuate movement of one end of said lever into vertical, substantially straight-line reciprocation of a subject device engaged by said adapter, the combination comprising: a vertical guide plate secured to said base member, said plate having a vertical slot extending through the upper edge thereof; a reciprocation plate parallel with and adjacent to said guide plate; cooperating guide and bearing means between and upon said guide and reciprocation plates restricting movement of said reciprocation plate to vertical reciprocation with respect to said guide plate; means secured to one side of said reciprocation plate and extending through said slot for engaging said subject device; and means secured to the other side of said reciprocation plate for engaging said one end of said lever.

3. The structure of claim 2 in which said guide and bearing means includes three vertically elongated grooves in each of the opposing surfaces of said guide and reciprocation plates, the centers of said guide plate grooves defining the corners of a triangle and being in registry with the centers of said reciprocation plate grooves in one position of said plates with respect to each other; and a ball bearing disposed between each pair of opposing grooves and spacing said plates from each other.

4. The structure of claim 2 in which said guide and bearing means includes: three vertically elongated grooves in each of the opposing surfaces of said guide and reciprocation plates, two of the grooves in said guide plate being on opposite sides of said slot and the third groove in said guide plate being below said groove, said guide plate grooves being in registry with said reciprocation plate grooves in one position of said plates with respect to each other; and a ball bearing disposed between each pair of opposing grooves and spacing said plates from each other.

5. The structure of claim 2 in which said guide and reciprocation plates each have three vertically elongated grooves in the opposing surfaces thereof, two of the grooves in said guide plate being on opposite sides of said slot and the centers of said guide plate grooves defining the corners of a triangle and being in registry with the center of said reciprocation plate grooves in one position of said plates with respect to each other, the means on said reciprocation plate engaging said lever being at the center of another triangle defined by said centers of the grooves on said reciprocation plate; and a ball bearing disposed between each pair of opposing grooves and spacing said plates from each other.

6. The device defined in claim 2 wherein the vertical guide plate is mounted only at the edges thereof to said base member and means including resilient means is applied between said lever and said reciprocation plate, said last-named means exerting sufficient force to effect a distortion of said vertical guide plate in such a direction as to provide a concavity facing said lever, the magnitude of said concavity being such that the mutually remote ends of the bearing guiding means thereon bear an angle in the direction of said reciprocation which is greater than the angle borne to said direction by the tangents to the arc defined by said one end of said lever at each end of its arcuate path.

7. The device defined in claim 2 wherein the vertical guide plate is mounted only at the edges thereof to said base member and means including a rubber cushion is applied between said lever and said reciprocation plate, said last-named means exerting sufficient force to effect a distortion of said vertical guide plate in such a direction has to provide a concavity facing said lever, the magnitude of said concavity being such that the mutually remote ends of the bearing guiding means thereon bear an angle in the direction of said reciprocation which is greater than the angle borne to said direction by the tangents to the arc defined by said one end of said lever at each end of its arcuate path.

8. The device defined in claim 2 wherein the vertical guide plate is mounted only at the edges thereof to said base member and means including resilient means is applied between said lever and said reciprocation plate, the bearing guiding means being sloped with respect to each other and with respect to the direction of said reciprocation to provide a concavity facing said lever, the magnitude of said concavity being such that the mutually remote ends of said bearing guiding means bears an angle in the direction of said reciprocation which is greater than the angle borne to said direction by the tangents to the arc defined by said one end of said lever at each end of its arcuate path.

9. In a translating mechanism for converting rotary motion of a lathe live spindle to reciprocating motion for a jig saw, said reciprocating motion being caused to occur at a point spaced from said spindle in a direction axially of said spindle, the combination comprising; a base, a lever pivotally mounted on said base for pivotal motion in a vertical plane and having a power receiving point and a power delivering point, said lever having its axis in the same vertical plane as the axis of said spindle, means including a crank connecting said spindle to the power receiving point of said lever whereby the rotary motion of said spindle is converted to reciprocating arcuate motion of said lever, a pair of relatively slidable plates, means guiding said plates in the direction of said reciprocating motion, one of said plates being anchored to said base; means connecting the power delivering point of said lever to the other of said plates whereby the reciprocating, arcuate motion of said lever is converted to reciprocating motion of said other plate.

References Cited in the file of this patent

UNITED STATES PATENTS

| | | |
|---|---|---|
| 339,000 | McEvilla | Mar. 30, 1886 |
| 2,307,431 | Tilden | Jan. 5, 1943 |
| 2,459,942 | Jackson | Jan. 25, 1949 |
| 2,622,940 | Johnson | Dec. 23, 1952 |